United States Patent [19]

Mizobuchi et al.

[11] Patent Number: 5,076,716
[45] Date of Patent: Dec. 31, 1991

[54] THRUST BEARING WITH SPIRAL GROOVED FACE

[75] Inventors: Shotaro Mizobuchi, Kanagawa; Katsumi Sasaki, Tokyo; YOshikazu Kimura, Kanagawa, all of Japan

[73] Assignee: Ebara Corporation, Tokyo, Japan

[21] Appl. No.: 540,442

[22] Filed: Jun. 18, 1990

Related U.S. Application Data

[63] Continuation of Ser. No. 627,731, Jul. 3, 1984, abandoned.

[30] Foreign Application Priority Data

Jul. 6, 1983 [JP] Japan ................. 58-121567

[51] Int. Cl.$^5$ ............................... F16C 17/08
[52] U.S. Cl. ..................... 384/369; 384/123; 384/902; 384/907.1; 384/913
[58] Field of Search ............... 384/112, 123, 283, 305, 384/369, 373, 100, 907, 907.1, 913, 625

[56] References Cited

U.S. PATENT DOCUMENTS

| | | | |
|---|---|---|---|
| 3,439,962 | 7/1969 | Gothberg | 384/107 |
| 3,497,273 | 2/1970 | Muijderman et al. | 384/113 |
| 3,591,243 | 7/1971 | Kaippenberg et al. | 384/907.1 X |
| 3,663,074 | 5/1972 | Fernlund | 384/123 |
| 3,883,314 | 5/1975 | Schnyder | 29/182.5 |
| 4,213,659 | 7/1980 | Tielemans et al. | 384/398 |
| 4,315,359 | 2/1982 | Gray | 384/100 X |
| 4,380,355 | 4/1983 | Beardmore | 384/123 |
| 4,410,285 | 10/1983 | Strasset et al. | 308/DIG. 8 X |
| 4,808,014 | 2/1989 | Ueda et al. | 384/907.1 |

FOREIGN PATENT DOCUMENTS

| | | |
|---|---|---|
| 2381199 | 9/1978 | France . |
| 41-12121 | 7/1941 | Japan . |
| 15121 | 1/1982 | Japan ................ 384/100 |

OTHER PUBLICATIONS

Asahi Kasei Pamphlet #1, Printing Plate System, APR Process for Producing Printing Plate.
Asahi Kasei Pamphlet #2, APR ASA System.

*Primary Examiner*—lenard A. Footland
*Attorney, Agent, or Firm*—Wenderoth, Lind & Ponack

[57] ABSTRACT

A thrust bearing having a spiral element and a flat element is provided wherein bothy elements are arranged so as to be rotatable relative to each other and the spiral element is made of ceramic having a pattern of spiral grooves on the surface thereof opposing the flat element. The spiral grooves are formed by a shot-blasting process applied through a resin mask having a spiral pattern, the depth of the grooves being kept within the range between 3 $\mu$m and 50 $\mu$m.

2 Claims, 5 Drawing Sheets

THRUST BEARING WITH SPIRAL GROOVED FACE

This application is a continuation of now abandoned application, Ser. No. 06/627,731 filed on July 3, 1984.

FIELD OF THE INVENTION

The present invention relates to a thrust bearing, and more particularly to the thrust bearing employed in an equipment adapted to be used underwater such as a submersible pump or a submersible motor, and the method for making such thrust bearing.

BACKGROUND OF THE INVENTION

A thrust bearing such as one employed in a submersible pump or a submersible motor is usually subjected to a condition in which a thrust load imposed thereon increases as the motor or pump is put into operation. The value of the thrust may reach more than 1,000 kg f even in a small sized pump and, thus, such thrust bearing is one of the portions to which great attention needs to be applied in manufacturing these pumps.

A thrust bearing of a tilting pad type which involves precisely machined divided elements has previously been used in submersible equipment. In order to allow such a bearing to be used with an adequate lubricating effect, highly viscous lubricating liquid is required and, therefore, it has been necessary to encase and seal lubricating oil or the like within the bearing.

Accordingly, in the conventional thrust bearing of the prior art, there have been drawbacks such as the problems of sealing the lubricating liquid, cooling the lubricating liquid, deterioration of the lubricating liquid, low loading capacity and low degree of reliability. Also, it can not be used for hot liquid such as hot spring water or underground water at a temperature of 200° C. or more.

SUMMARY OF THE INVENTION

Accordingly, there has been a need for a thrust bearing which is free from the drawbacks referred to above.

Therefore, it is an object of the present invention to provide a thrust bearing which has no such drawbacks as those referred to above, namely lubricant sealing and cooling difficulties and deterioration of the same, which has high load capacity and reliability and which can be used with high temperature liquid and which is especially useful in submersible equipment. It is a still further object of the present invention to provide a method for manufacturing the thrust bearing which overcomes the drawbacks of the prior art.

The above objects are accomplished according to the present invention wherein at least one of the rotary and stationary members of the thrust bearing is made of ceramics and the surface of the ceramic member facing and abutting the other member is provided with a plurality of shallow spiral grooves. The spiral grooves are formed by placing a resin mask having a spiral pattern on the ceramic surface and using a shot-blast process on the surface through the resin mask. The remaining member to be opposed to the ceramic member having the spiral grooves is made of materials which will not easily cause wear on the ceramic surface. For example, sintered bronze containing 10% carbon (by weight) or sintered hard metal are used. The depth of the spiral grooves formed on the ceramic member is preferably within the range of between 3 $\mu$m and 50 $\mu$m. If this depth is too small such as smaller than 3 $\mu$m, uneven dynamic fluid pressure may be produced thereby, or worn particles generated by the frictional rotation may fill the grooves thereby lowering the efficiency of the thrust bearing. Also, forming such shallow grooves having a depth smaller than 3 $\mu$m is not economical in production terms. On the other hand, if the depth of the spirals exceeds 50 $\mu$m, sufficient dynamic pressure may not be generated.

The present invention will be further clarified by the following description referring to the accompanying drawings, a brief description thereof being summarized below.

Figure 1:
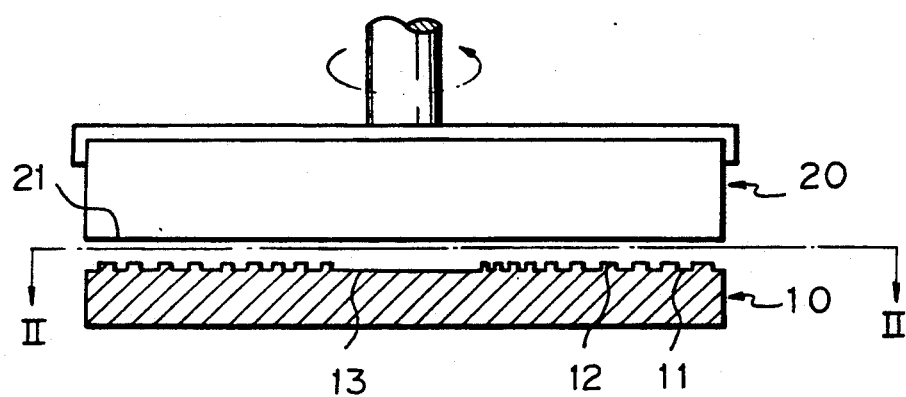
FIG. 1 is a schematic side view of the thrust bearing according to the present invention wherein one of the elements is shown in cross section.
Figure 2:
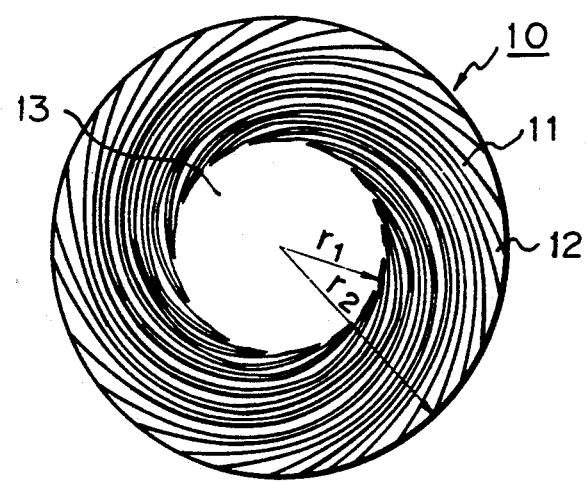
FIG. 2 is a plan view of a spiral element as viewed along the line II—II in FIG. 1.

DETAILED DESCRIPTION OF THE PREFERRED EMBODIMENTS:

Referring now to FIG. 1, there is illustrated a thrust bearing according to the present invention which comprises a stationary element 10 and a rotary element 20. A plan view of the element 10 as seen along the line II—II is illustrated in FIG. 2. In this case, a plurality of spiral grooves 11 are formed on a flat surface of a stationary element 10. For convenience, the element 10 is referred to as a spiral element and the element 20 is referred to as a flat element. The spiral element 10 is made of ceramic in a disc form. The flat element 20 is made of hard, wear-resistant metal in a disc form and its flat disc surface 21 is disposed coaxially with the element 10 so that the surface bearing the spiral grooves 11 and the flat surface 21 are contacted with each other under the thrust pressure. In FIG. 1, it is illustrated that the flat element 20 is rotatable while the spiral element 10 is stationary. However, it is optional which is stationary and which is rotatable provided that the relative rotation therebetween is arranged so that liquid introduced between the two elements is directed towards the center of the elements from the peripheral portion of the elements while generating dynamic pressure in the liquid. Further, the positional relationship with regard to which of the elements is disposed above or below is also optional.

On the spiral surface, a ridge or land 12 is left between the adjacent grooves 11. At the center portion of the spiral surface, a recessed circle area 13 is provided. The depth of the recessed area 13 from the top of the ridge may be equivalent to the depth of the grooves 11. However, such dimensional relationship is not a mandatory requirement. The depth of the grooves 11 is preferably arranged to be within a range between 3 μm and 50 μm for the reason explained hereinabove.

Now the method for producing the spiral grooves on the ceramic disc will be described. While ceramics are superior in anti-corrosion and anti-wear characteristics, it is very difficult to work them. The shallow spiral grooves 11 are, thus, not easily produced on the surface of the ceramic. A conventional cutting operation or etching operation is not suitable for producing the grooves on the surface of the ceramics. The electric discharge process may be applicable to ceramics to form the grooves if the ceramics have electric conductivity such as $Si_3N_4$ to which TiN or SiC have been added in which Si is remaining. However, in such case, manufacturing the electrodes required therefor is expensive and consumption thereof by such discharge is rapid. Therefore, such process is not economical and precision working thereby is difficult. A process utilizing a laser is also not suitable for similar reasons to those in the application of the electric discharging process.

The inventors of the present invention have succeeded in forming the required spiral grooves on the surface of the disc by employing a shot-blast process in association with the use of a resin or plastic mask placed over the ceramic surface.

That is, the surface of the ceramic disc is covered by a plastic mask of a spiral pattern and minute particles of abrasive materials such as alumina ($Al_2O_3$) are directed onto the ceramic surface through the mask to form the spiral grooves on the surface within a relatively short time. A suitable size for the alumina is in the range of 25 μm—105 μm with respect to the mean grain diameter thereof.

The mask having a spiral pattern is made of plastic or resin which is photosensitive. Such mask is prepared by the following steps. At first, a negative film having a desired spiral pattern corresponding to, for example that shown in FIG. 2 (or FIG. 8) is produced and placed on a glass plate over which a transparent cover sheet is placed. Over the cover sheet, a photosensitive resin or plastic is coated in a uniform thickness and over this a base film is laminated. Then the photosensitive layer of the plastic is exposed to ultraviolet rays for a few seconds to harden the exposed area of the photosensitive layer. Then the glass plate, the negative film and the cover sheet are removed and the unexposed portions of the resin are washed out chemically to produce a mask having a spiral pattern. The produced mask is temporarily covered with a protecting paper on the side opposite the laminated base film until the mask is used. The mask may be subjected to a secondary exposure before applying the protecting paper for storage in order to further harden the spiral pattern.

In use, the protecting paper is removed and the mask is adhered to the surface of the ceramic disc with the base film. Then the base film is removed and the shot blast process is applied to the surface through the mask. The base film is preferably be a double layered type comprising an auxiliary layer and a support layer so that the support layer can be removed while leaving the auxiliary layer on the mask. The auxiliary layer is thin and will not become a barrier to the shot-blast process, since there is no substantial resistance in the auxiliary layer against the injected minute blasting particles. The plastic or resin used for making the mask in this method may be polyester, PVA etc.

Figure 3:
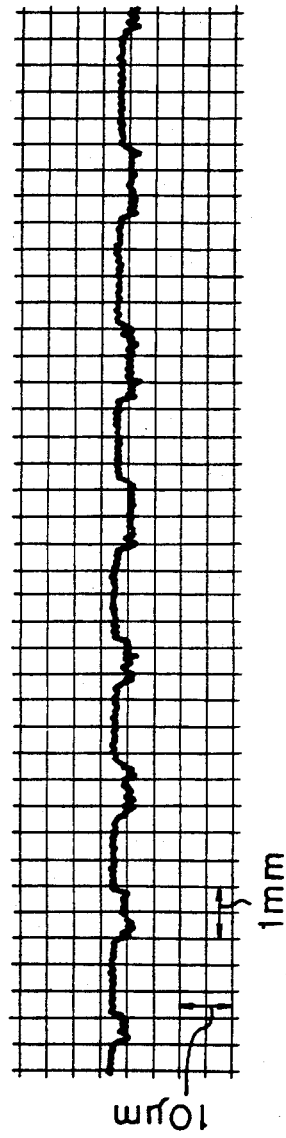
FIGS. 3 and 4 illustrate the dimensions of the grooves formed on the surface of the spiral element on an enlarged scale.
Figure 4:
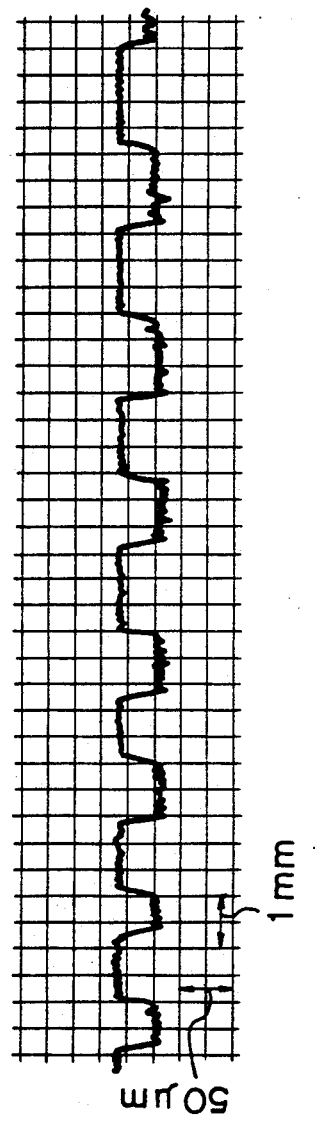

FIG. 3 and FIG. 4 are examples showing the actual dimension of the grooves obtained by the process according to the present invention. FIG. 3 shows the dimension produced by shot-blasting on the surface of sintered SiC ceramic having a specific gravity of 3.10 over which the mask is applied. The shot-blasting was performed with alumina particles under an air pressure of 4 kg.f/cm² while keeping the blast nozzle a distance 150 mm away from the surface. Approximately uniform grooves having a depth of about 5 μm were obtained during the operation period of 10 seconds. In FIG. 4, similar to FIG. 3, another result is shown in which the same process of FIG. 3 was applied except for the operating time which was 30 seconds and a mean groove depth of about 30 μm was obtained.

Figure 5:
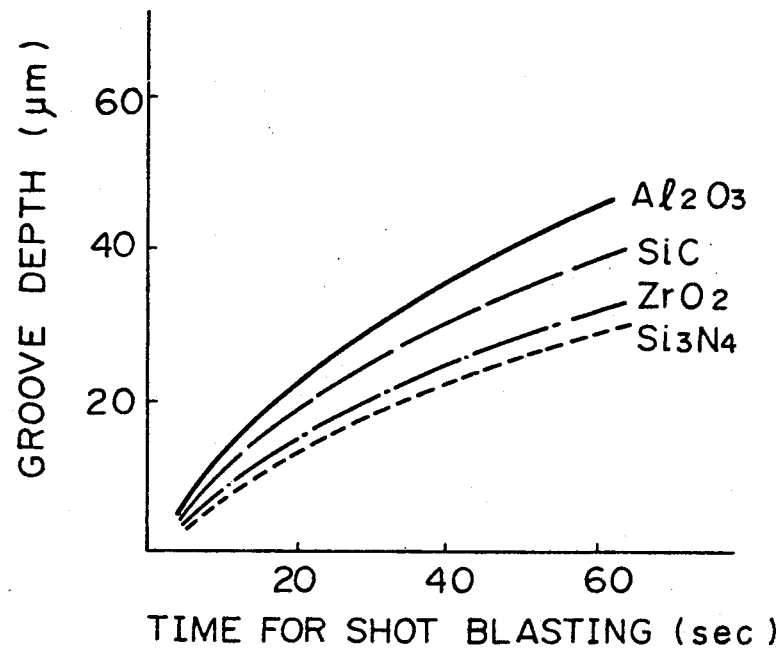
FIG. 5 shows the relationship between the groove depth and the processing time of the shot-blasting operation.

In FIG. 5, the relationship between the groove depth and the time for operating the shot-blasting is shown for the various ceramic materials appearing in this figure. As seen from the curves of FIG. 5, it is clear that a desired depth may be obtained by controlling the operating time.

In order to demonstrate and confirm the characteristic features of the thrust bearing produced according to the present invention, a series of tests was conducted.

Figure 6:
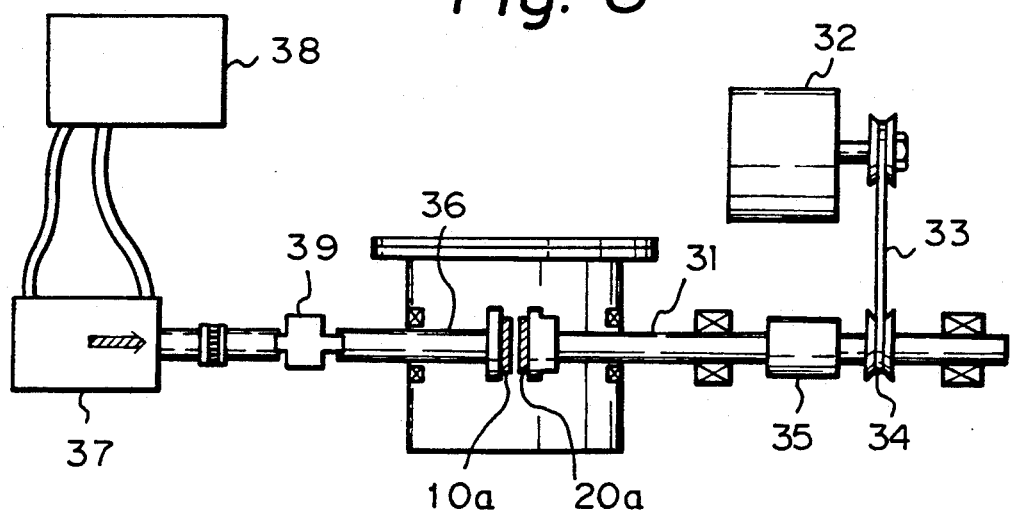
FIG. 6 schematically illustrates testing equipment for evaluating the features of the thrust bearings.

FIG. 6 schematically illustrates testing equipment used to compare the thrust bearing according to the present invention and the conventional tilting pad type thrust bearing. 10a designates a stationary element of the thrust bearing and 20a designates a rotary element in the test. A rotary shaft 31 supports the rotary element 20a and is driven by a variable speed motor 32 through a belt 33 trained around pulleys. The motor 32 can rotate at a speed of between 10 r.p.m. and 5000 r.p.m. On the shaft 31, a torque meter 35 is mounted. In opposed relation to the element 20a, the stationary element 10a is disposed on a non-rotatable shaft 36. A hydraulic cylinder 37 (capable of applying maximum thrust of 10,000 kg.f) is coupled to the shaft so as to impose a test load on the elements 10a and 20a. The hydraulic cylinder 37 is operated by a hydraulic pump 38. A load cell 39 is disposed between the cylinder 37 and the shaft 36 to measure the thrust load.

The sample bearings tested were as follows:

Present Invention

Test 1

Spiral element

| Sintered SiC | |
|---|---|
| Outer Diameter | 86 mm |
| $r_1$ (FIG. 2) | 20 mm |
| $r_2$ (FIG. 2) | 43 mm |
| Thickness | 4 mm |
| Number of Spirals | 15 |
| total groove area / total land area | 1 |
| Groove Depth | 15 μm |

Flat element
Bronze Alloy containing 10% carbon.

Test 2

Spiral element
Material was changed to β-type sintered SiC. Other data are the same as those in the rotary element in test 1.

Stationary element
Same as those in test 1.

Prior Art (Tilting-pad bearing)
Rotary element
Carbon.
Stationary element (pad)
13% Cr Stainless-steel. The total area of sliding surfaces of this bearing was arranged to be equal to the area of the annular spiral area in the spiral element used in tests 1 and 2.

Figure 7:
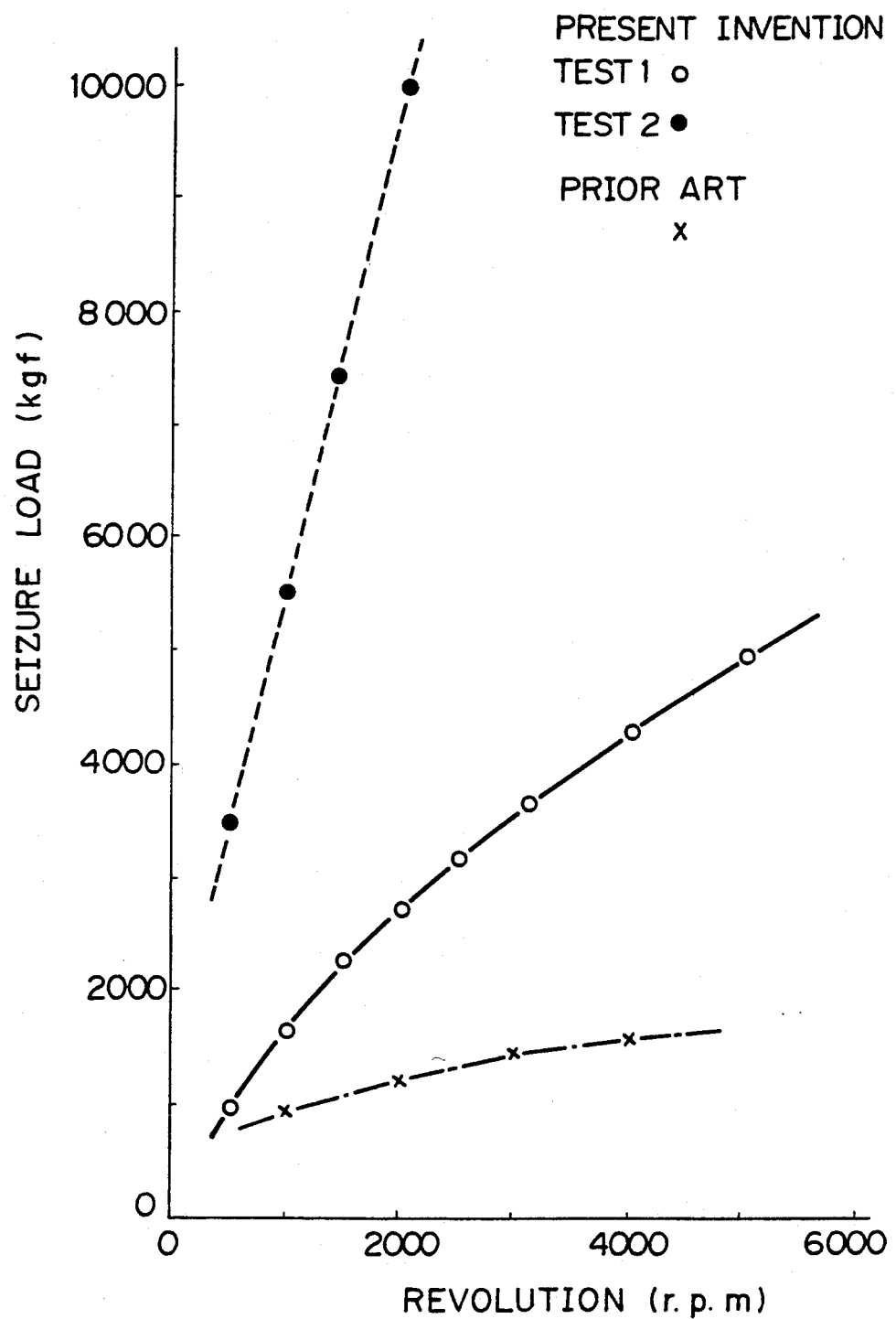
FIG. 7 illustrates the results of the tests using the equipment of FIG. 6 for various bearings.

The results of the comparison test are plotted in FIG. 7 illustrating the relationship between the seizure load and the rotational speed.

As seen from FIG. 7, the prior art bearing seized at 3,000 r.p.m. under a load of 1,500 kg.f while the bearing according to the present invention was able to withstand more than 3,800 kg.f for test 1 and more than 10,000 kg.f for test 2 at 3,000 r.p.m., respectively. This ability to withstand the load is increased as the revolutional speed is increased and therefore, it is particularly efficient and useful for submersible equipment such as a submersible pump wherein the thrust load is small at the starting point and is gradually increased as the rotational speed is increased.

The following Tables I and II indicate other test data showing the variation of the frictional coefficients under various testing conditions for the thrust bearing according to the present invention and a conventional tilting pad thrust bearing, respectively.

TABLE I (The present invention)

| Groove Depth ($\mu$m) | Lubrication | Seizure Load (kg · f) | Friction Coefficient ($\mu$) |
|---|---|---|---|
| 5 | water (room temp.) | 4,300 | 0.0025 |
| 15 | water (room temp.) | 3,750 | 0.0030 |
| 30 | water (room temp.) | 3,250 | 0.0034 |
| 15 | oil (room temp.) | 5,000 | 0.0022 |
| 15 | silicone oil (300° C.) | 3,200 | 0.0035 |

The bearings used to obtain the data above were the same as those used in the test 1 for FIG. 7 except for the groove depths listed above.

TABLE II (Tilting-Pad Type Thrust Bearing)

| Lubrication | Seizure Load (kg · f) | Friction Coefficient ($\mu$) |
|---|---|---|
| water (room temp.) | 200 | 0.0600 |
| oil (room temp.) | 1,600 | 0.0069 |
| silicone oil (300° C.) | 200 | 0.0600 |

The bearings used to obtain the data of Table II were the same as the tilting-pad type bearings used for the test shown in FIG. 7.

According to Tables I and II, it is clear that the conventional tilting type thrust bearing easily seizes under a relatively small load such as 200 kg.f with lubrication of water (room temperature) or silicone oil (300° C.) but the bearing according to the present invention was able to withstand higher loads with the high temperature lubrication of silicone oil. Further, the friction coefficient of the bearing according to the present invention is as small as less than half of that of the prior art whereby a motor of smaller capacity is enough for driving submersible equipment when the bearing of the present invention is employed.

The inventors further verified the process according to the present invention by comparing it with the conventional process for producing a spiral pattern. The dimension of the spiral element used in this test was the same as that used in test 1 for FIG. 7. The results are summarized in the following Table III.

TABLE III

| Method for Producing Grooves | Material of Bearing | | Allowable Maximum Load (kg) |
|---|---|---|---|
| | Spiral element | Flat element | |
| Present Invention (Shot-Blast for 10 seconds) | sintered SiC | Al$_2$O$_3$ | 4,720 |
| | sintered SiC | sintered bronze containing carbon | 7,430 |
| | sintered β type-SiC | sintered hard metal | 10,000 |
| Conventional Electric Discharge | sintered SiC | sintered bronze containing carbon | 2,090 |
| Conventional Photostating | 13% Cr stainless steel | metal impregnated carbon | 580 |

The bearing produced according to the present invention exhibited a performance capable of withstanding a remarkably high load although the compared material combinations were not the same.

The materials to be used for the thrust bearing according to the present invention may be selected from the combinations other than shown in Table III such as (SiC:Si$_3$N$_4$) and (Si$_3$N$_4$:Al$_2$O$_3$), etc. Now the configuration of the spiral is touched upon. The spiral is selected in consideration of the point that the dynamic pressure is produced in the liquid introduced between the spiral and flat elements when relative rotation is caused therebetween.

Figure 8:
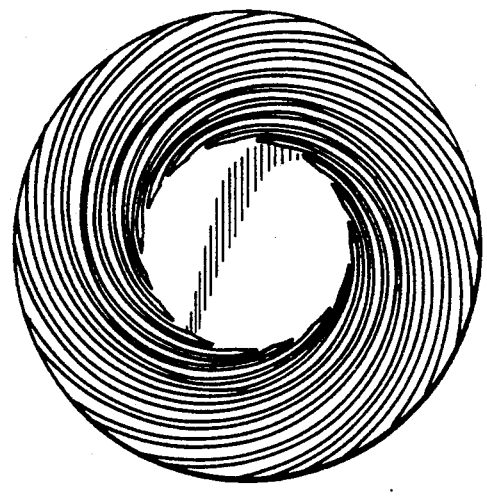
FIG. 8 is a photo of the pattern of the grooves.

FIG. 8 shows an example of a spiral pattern actually used.

Figure 9:
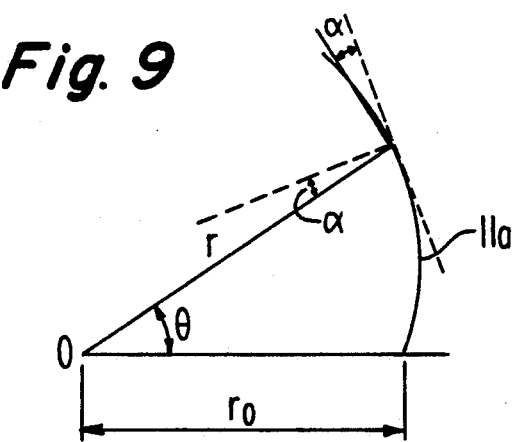
FIG. 9 illustrates one example of the spiral curves.

FIG. 9 shows an example of the spiral curve. In this case, the curve 11a corresponds to the polar equation of $$r = r_0 e^{\theta \tan \alpha}$$

wherein
$r_0$: initial value of r when $\theta = 0$
$\theta$: angle of "r" relative to the initial $r_0$
$\alpha$: angle measured between r and the normal to the tangent drawn to the curve at the (r, $\theta$).

As noted above, the curve is not limited to that shown in FIG. 9 provided that dynamic pressure is generated upon relative rotation between the spiral element and the flat element.

Now it will be clear from the foregoing that the present invention provides many advantages over the prior art such as summarized below.

a. The size of the necessary motor can be reduced since the thrust shaft is able to be made small due to the increased anti-thrust capacity.

b. The capacity of the motor can be reduced, since the friction loss is remarkably reduced, say to less than half of the loss in the bearing of the prior art.

c. In the case of a submersible pump, liquid to be handled by the pump, such as water, is utilized for lubrication.

d. It can be used for a liquid bearing at high temperature such as hot springs or subterranean hot water, since the bearing is made of anti-corrosion and wear resistant material.

e. The groove depth is easily controlled by varying the shot-blasting time.

f. Economical production of the bearing is possible.

While the present invention has been explained in detail referring to the preferred embodiments, it should be understood that modification and change are possible by those skilled in the art within the spirit and scope of the present invention defined in the Claims annexed.

What is claimed is:

1. A thrust bearing comprising: a stationary element and a rotary element having opposed surfaces adapted to abut against each other, the opposed surface of one of said elements having a plurality of spiral grooves therein and the opposed surface of the other of said element being a flat surface abutting against said one surface of said one element, said one element being completely of sintered ceramics for facilitating the formation therein of grooves formed by a shot-blasting process, said spiral grooves having been formed by said shot-blasting process, and the other element being of ceramics or hard metal.

2. A thrust bearing as claimed in claim 1 wherein the element in which said spiral grooves are formed is made of SiC.

* * * * *